(12) United States Patent
Park et al.

(10) Patent No.: US 8,385,411 B2
(45) Date of Patent: Feb. 26, 2013

(54) METHOD AND AN APPARATUS FOR ENCODING OR DECODING A VIDEO SIGNAL

(75) Inventors: Joon Young Park, Seoul (KR); Byeong Moon Jeon, Seoul (KR); Seung Wook Park, Seoul (KR)

(73) Assignee: LG Electronics Inc., Seoul (KR)

( * ) Notice: Subject to any disclaimer, the term of this patent is extended or adjusted under 35 U.S.C. 154(b) by 386 days.

(21) Appl. No.: 12/412,526

(22) Filed: Mar. 27, 2009

(65) Prior Publication Data

US 2009/0252221 A1 Oct. 8, 2009

Related U.S. Application Data

(60) Provisional application No. 61/040,123, filed on Mar. 27, 2008, provisional application No. 61/048,226, filed on Apr. 28, 2008, provisional application No. 61/073,008, filed on Jun. 16, 2008, provisional application No. 61/076,691, filed on Jun. 30, 2008.

(30) Foreign Application Priority Data

Mar. 26, 2009 (KR) .................. 10-2009-0025691

(51) Int. Cl.
*H04N 11/02* (2006.01)
(52) U.S. Cl. .......... 375/240.12; 375/240.02; 375/240.29
(58) Field of Classification Search ............ 375/240.12, 375/29
See application file for complete search history.

(56) References Cited

U.S. PATENT DOCUMENTS

| | | | | |
|---|---|---|---|---|
| 7,299,251 B2 * | 11/2007 | Skidmore et al. | ............ | 708/322 |
| 7,894,534 B2 * | 2/2011 | Joch et al. | ................ | 375/240.25 |
| 2003/0101048 A1 * | 5/2003 | Liu | ................ | 704/208 |
| 2003/0219073 A1 | 11/2003 | Lee et al. | | |
| 2004/0032908 A1 | 2/2004 | Hagai et al. | | |
| 2005/0025008 A1 * | 2/2005 | Wang et al. | ................ | 369/47.22 |
| 2006/0133490 A1 | 6/2006 | Lee et al. | | |
| 2009/0129465 A1 * | 5/2009 | Lai et al. | ................ | 375/240.02 |

FOREIGN PATENT DOCUMENTS

| | | |
|---|---|---|
| CN | 1625902 | 6/2005 |
| CN | 1756368 | 4/2006 |
| EP | 1841230 A1 | 10/2007 |
| JP | 2005-503737 | 2/2005 |
| JP | 2006-054916 | 2/2006 |
| JP | 2007-036463 | 2/2007 |
| JP | 2007-174196 | 7/2007 |
| JP | 2003-31 9398 | 11/2007 |
| WO | WO2007/111292 | 10/2007 |

OTHER PUBLICATIONS

Internaional Search Report issued in International Application No. PCT/KR2009/001578, mailed Nov. 2, 2009, 4 pages.
European Search Report dated Jan. 7, 2011 for Application No. 09004506.3, 7 pages.
Office Action dated Jul. 2, 2012 issued by the Chinese Patent Office for Application No. 200980111114.0 ; 13 pages.

* cited by examiner

*Primary Examiner* — David Czekaj
*Assistant Examiner* — Leron Beck
(74) *Attorney, Agent, or Firm* — Fish & Richardson P.C.

(57) ABSTRACT

A method of processing a video signal is disclosed. The present invention includes receiving prediction information of a macroblock and filter information, predicting a current picture using the prediction information of the macroblock, and applying a filter using the predicted current picture and the filter information. Accordingly, accuracy of prediction can be enhanced by applying a filter to a frame predicted before a residual for a predicted frame is coded. As the residual is reduced, efficiency of video signal processing can be enhanced.

7 Claims, 11 Drawing Sheets

METHOD AND AN APPARATUS FOR ENCODING OR DECODING A VIDEO SIGNAL

CROSS-REFERENCE TO RELATED APPLICATIONS

This application claims the benefit of U.S. Provisional Application 61/040,123, filed Mar. 27, 2008, U.S. Provisional Application 61/048,226, filed Apr. 28, 2008, U.S. Provisional Application 61/073,008, filed Jun. 16, 2008 and U.S. Provisional Application 61/076,691, filed Jun. 30, 2008, and claims the benefit of South Korea App. No. 10-2009-0025691, filed Mar. 26, 2009, all of which are incorporated herein by reference.

TECHNICAL FIELD

The present invention relates to an apparatus for encoding or decoding a video signal and method thereof.

BACKGROUND ART

In transmitting an encoded video signal to a decoder, a method of removing temporal redundancy and spatial redundancy to raise a compression ration of a video signal, i.e., an intra prediction method and an inter prediction method are used.

DISCLOSURE OF THE INVENTION

Technical Problem

An object of the present invention is to improve efficiency of coding in coding a residual for a current frame.

Another object of the present invention is to enhance accuracy of inter prediction.

Another object of the present invention is to enhance efficiency of coding in coding filter information.

Technical Solution

The present invention is characterized in applying a filter for minimizing a difference between a predicted frame by performing intra or inter prediction and an original frame.

The present invention is characterized in applying a filter prior to storing a reconstructed frame in a decoded picture storing unit, storing a frame through the filter in the decoded picture storing unit, and using the stored frame for inter prediction.

The present invention is characterized in compensating for an illumination intensity difference between an original frame and a reconstructed frame.

The present invention is characterized in using a flag indicating whether to apply filter information of a previous frame to a current frame in obtaining a filter to apply to the current frame.

The present invention is characterized in using a difference filter between a filter of a current frame and a filter of a previous frame in obtaining a filter to apply to the current frame.

The present invention is characterized in using a prediction filter and a difference filter between a filter of a current frame and the prediction filter in obtaining a filter to apply to the current frame.

The present invention is characterized in updating a prediction filter applied to a current frame into a filter applied to a previous frame.

Advantageous Effects

Accordingly, the present invention provides the following effects or advantages.

First of all, the present invention is able to improve accuracy of current frame prediction by applying a filter to a frame predicted before coding a residual for a current frame and is able to enhance efficiency of video signal processing by reducing the residual correspondingly.

Secondly, a difference between an original frame and a reconstructed frame can be reduced by applying a filter in a reconstructed frame, whereby accuracy of reconstruction can be improved. And accuracy of inter prediction can be improved by using a reconstructed frame as a reference frame.

Thirdly, by compensating for an illumination intensity for a reconstructed frame, error attributed to various rounding operations in a video signal processing process can be reduced. And, accuracy can be improved in reconstructing a frame.

Fourthly, it is able to efficiently code filter information of a current frame using a flag indicating whether to apply filter information of a previous frame to the current frame.

Fifthly, it is able to efficiently code filter information of a current frame using a difference filter between a filter of the current frame and a filter of a previous frame.

Sixthly, it is able to efficiently code filter information of a current frame using a prediction filter for a whole sequence.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of processing a video signal according to the present invention includes receiving prediction information of a macroblock and filter information, predicting a current picture using the prediction information of the macroblock, and applying a filter using the predicted current picture and the filter information.

According to the present invention, in generating a prediction value of the macroblock, the prediction value of a current block with the macroblock is generated using the prediction value of a neighbor block with the macroblock in case of intra prediction.

According to the present invention, in the applying the filter, the filter is applied by considering a type of the macroblock, a quantization parameter of the macroblock, a coded block pattern (CBP) of the macroblock and a block boundary strength between blocks.

According to the present invention, the applying the filter further includes searching for a boundary area within a picture and the filter is applied by discriminating the boundary area and a non-boundary area. And the filter is applied in each region by dividing a frame by N*N size (where the N is a natural number).

To further achieve these and other advantages and in accordance with the purpose of the present invention, an apparatus for processing a video signal according to the present invention includes a receiving unit receiving prediction information of a macroblock and filter information, a predicting unit predicting a current picture using the prediction information of the macroblock, and a filtering unit applying a filter using the predicted current picture and the filter information.

To further achieve these and other advantages and in accordance with the purpose of the present invention, a method of processing a video signal according to the present invention includes applying a deblocking filter to a decoded picture, applying a filter to the deblocking-filtered decoded picture, and storing the filtered decoded picture in a decoded picture buffer.

According to the present invention, in the applying the filter to the deblocking-filtered decoded picture, the filter is applied by considering a type of a macroblock, a quantization parameter of a macroblock, a coded block pattern (CBP) of a macroblock and a block boundary strength between blocks.

According to the present invention, the applying the filter to the deblocking-filtered decoded picture further includes searching for a boundary area within a picture and the filter is applied by discriminating the boundary area and a non-boundary area.

According to the present invention, the method further includes compensating for an illumination intensity difference between an original picture and the filtered decoded picture for the filtered decoded picture.

To further achieve these and other advantages and in accordance with the purpose of the present invention, an apparatus for processing a video signal according to the present invention includes a deblocking filtering unit applying a deblocking filter to a decoded picture, a filtering unit applying a filter to the deblocking-filtered decoded picture, and a decoded picture storing unit storing the filtered decoded picture in a decoded picture buffer.

To further achieve these and other advantages and in accordance with the purpose of the present invention, In obtaining filter information to apply to a current frame, a method of processing a video signal according to the present invention includes using a flag indicating whether to apply filter information of a previous frame to the current frame.

According to the present invention, if the flag instructs to apply the filter information of the previous frame to the current frame, the filter information of the previous frame is used as a filter of the current frame. If the flag instructs not to apply the filter information of the previous frame to the current frame, the filter information of the current frame is used as the filter of the current frame According to the present invention, the filter information of the current frame is obtained from a difference value between the filter information of the previous frame and the filter information of the current frame and the filter information of the previous frame.

To further achieve these and other advantages and in accordance with the purpose of the present invention, a method of processing a video signal according to the present invention includes obtaining filter information of a current frame from a difference filter between prediction filter information of the current frame and filter information of the current frame and the predicted filter information.

According to the present invention, the prediction filter information of the current frame includes an average value of the filter information on each frame of a whole sequence.

According to the present invention, the prediction filter information of the current frame uses a filter of a previous frame as a prediction filter of the current frame.

It is to be understood that both the foregoing general description and the following detailed description are exemplary and explanatory and are intended to provide further explanation of the invention as claimed.

MODE FOR INVENTION

Reference will now be made in detail to the preferred embodiments of the present invention, examples of which are illustrated in the accompanying drawings. First of all, terminologies in the present invention can be construed as the following references. And, terminologies not disclosed in this specification can be construed as the following meanings and concepts matching the technical idea of the present invention.

Therefore, the configuration implemented in the embodiment and drawings of this disclosure is just one most preferred embodiment of the present invention and fails to represent all technical ideas of the present invention. Thus, it is understood that various modifications/variations and equivalents can exist to replace them at the timing point of filing this application.

In the present invention, filter application is provided to enhance efficiency of video signal processing. And, it is understood that the application of filter can be omitted if efficiency of video signal processing is lowered due to the filter application. Therefore, filter information is understood as including information indicating whether to use a filter as well as a filter coefficient, a filter size and the like. In case of applying a filter, the present invention is not limited by a specific method. Therefore, it is understood that a most efficient one is selected from various methods proposed by the present invention.

Figure 1:
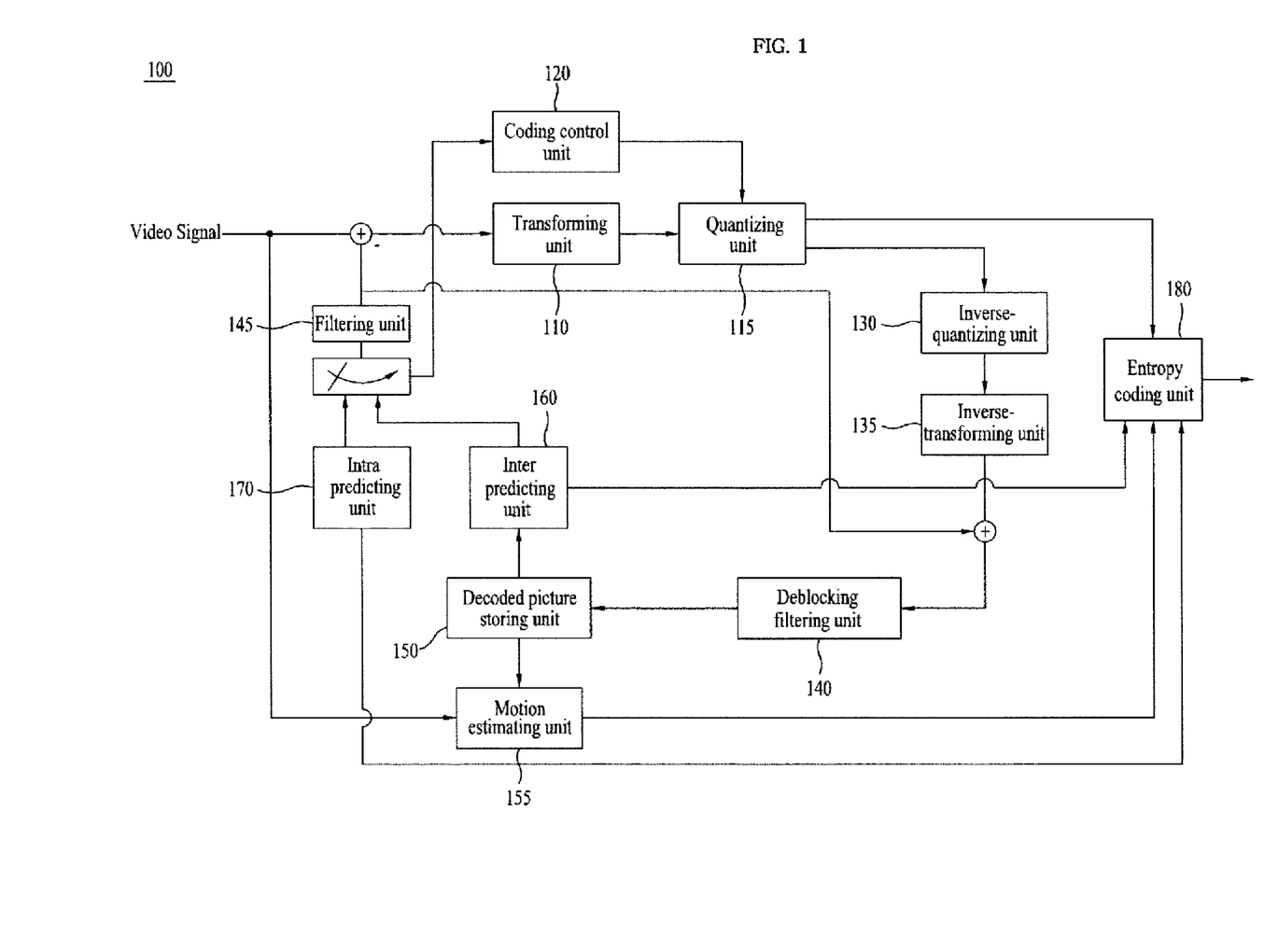
FIG. 1 is a schematic block diagram of a video signal encoding apparatus (100) according to a first embodiment of the present invention.

FIG. 1 is a schematic block diagram of a video signal encoding apparatus (100) according to a first embodiment of the present invention.

Referring to FIG. 1, a transforming unit (110), a quantizing unit (115), a coding control unit (120), an inverse-quantizing unit (130), an inverse-transforming unit (135), a deblocking filtering unit (140), a filtering unit (145), a decoded picture storing unit (150), a motion estimating unit (155), an inter predicting unit (160), an intra predicting unit (170) and an entropy coding unit (180).

The transforming unit (110) obtains a transform coefficient value by transforming a pixel value. For this case, a discrete cosine transform or wavelet transform is available. The quantizing unit (115) quantizes the transform coefficient value outputted from the transforming unit (110). The coding control unit (120) controls whether to perform intra coding or inter coding on a specific block or frame. The inverse-quantizing unit (130) inverse-quantizes the transform coefficient value. The inverse-transforming unit (135) reconstructs the inverse-quantized transform coefficient value into an original pixel value. The deblocking filtering unit (140) is applied to each coded macroblock to reduce a block distortion phenomenon. A picture through the deblocking filtering is stored in the decoded picture storing unit (150) to be used as a reference picture. The motion estimating unit 155 searches reference picture for a reference block most similar to a current block using the reference pictures stored in the decoded picture storing unit (150) and then delivers position information of the searched reference block and the like to the entropy coding unit (180). The inter predicting unit (160) performs prediction of a current picture using the reference picture and then delivers inter coding information to the entropy coding unit (180). The intra predicting unit (170) performs intra prediction with a decoded pixel within the current picture and then delivers intra coding information to the entropy coding unit (180). The filtering unit (145) is applied to a predicted current picture to reduce a difference between the predicted current picture and an original picture. The entropy coding unit (180) generates a video signal stream by performing entropy coding on the quantized transform coefficient, the inter coding information, the intra coding information, reference block information inputted from the motion estimating unit (160) and the like.

Figure 2:
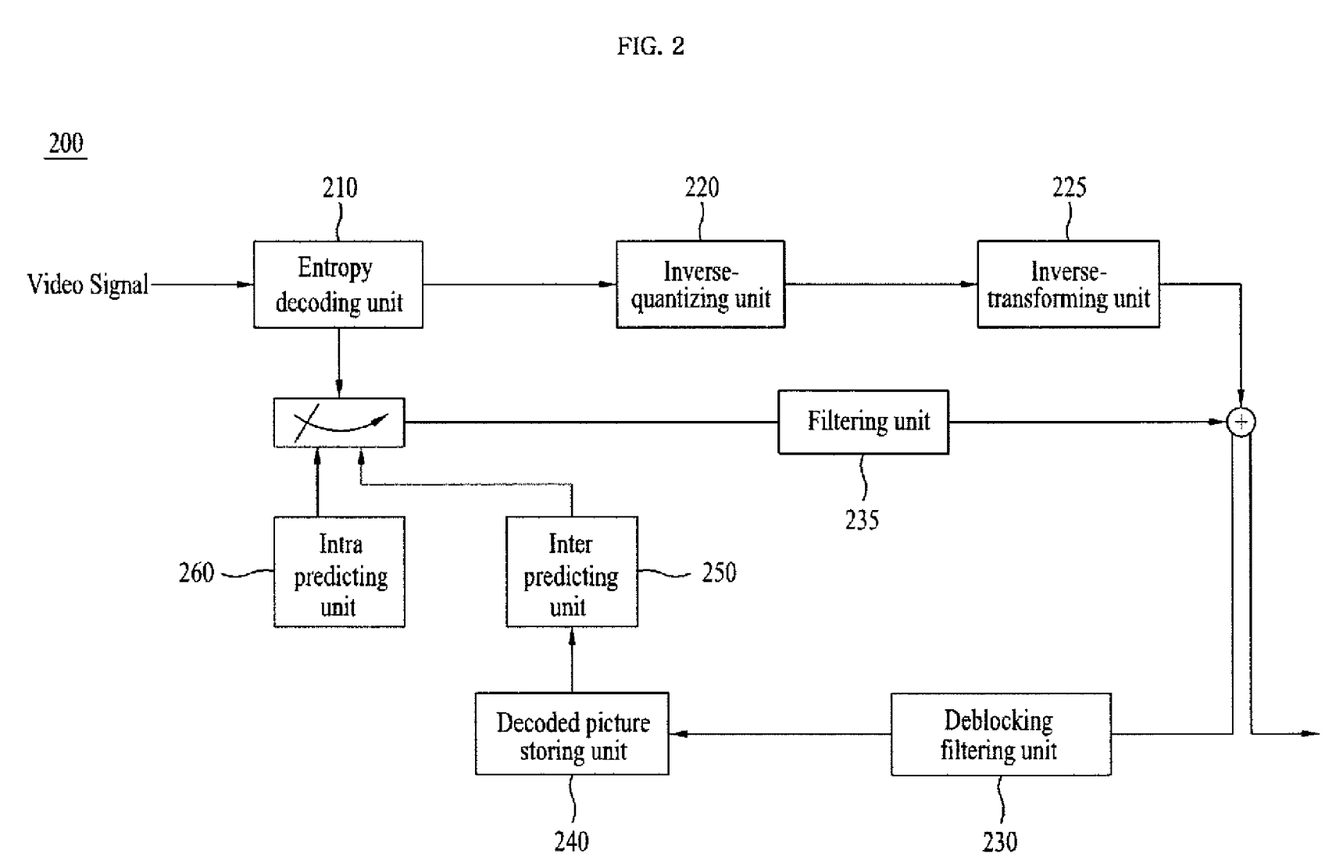
FIG. 2 is a schematic block diagram of a video signal decoding apparatus (200) according to a first embodiment of the present invention.

FIG. 2 is a schematic block diagram of a video signal decoding apparatus (200) according to a first embodiment of the present invention.

Referring to FIG. 2, a video signal decoding apparatus according to the present invention includes an entropy decoding unit (210), an inverse-quantizing unit (220), an inverse-transforming unit (225), a deblocking filtering unit (230), a filtering unit (235), a decoded picture storing unit (240), an inter predicting unit (250) and an intra predicting unit (260).

The entropy decoding unit (210) extracts a transform coefficient of each macroblock, a motion vector and the like by entropy-decoding a video signal bitstream. The inverse-quantizing unit (220) inverse-quantizes the entropy-decoded transform coefficient and the inverse-transforming unit (225) reconstructs an original pixel value using the inverse-quantized transform coefficient. The deblocking filtering unit (230) is applied to each coded macroblock to reduce a block distortion phenomenon. A picture through filtering is outputted or stored in the decoded picture storing unit (240) to be used as a reference picture. The inter predicting unit (250) predicts a current picture using the reference picture stored in the decoded picture storing unit (240) and inter prediction information (e.g., reference picture index information, motion vector information, etc.) delivered from the entropy decoding unit (210). The intra predicting unit (260) performs intra prediction from a decoded pixel within a current picture. The filtering unit (235) is applied to the predicted current picture from the inter predicting unit or the intra predicting unit. The predicted current picture through the filtering unit (235) and a residual from the inverse-transforming unit are added together to reconstruct an original picture. In the following description, a filtering process of the present invention is explained in detail.

Figure 3:
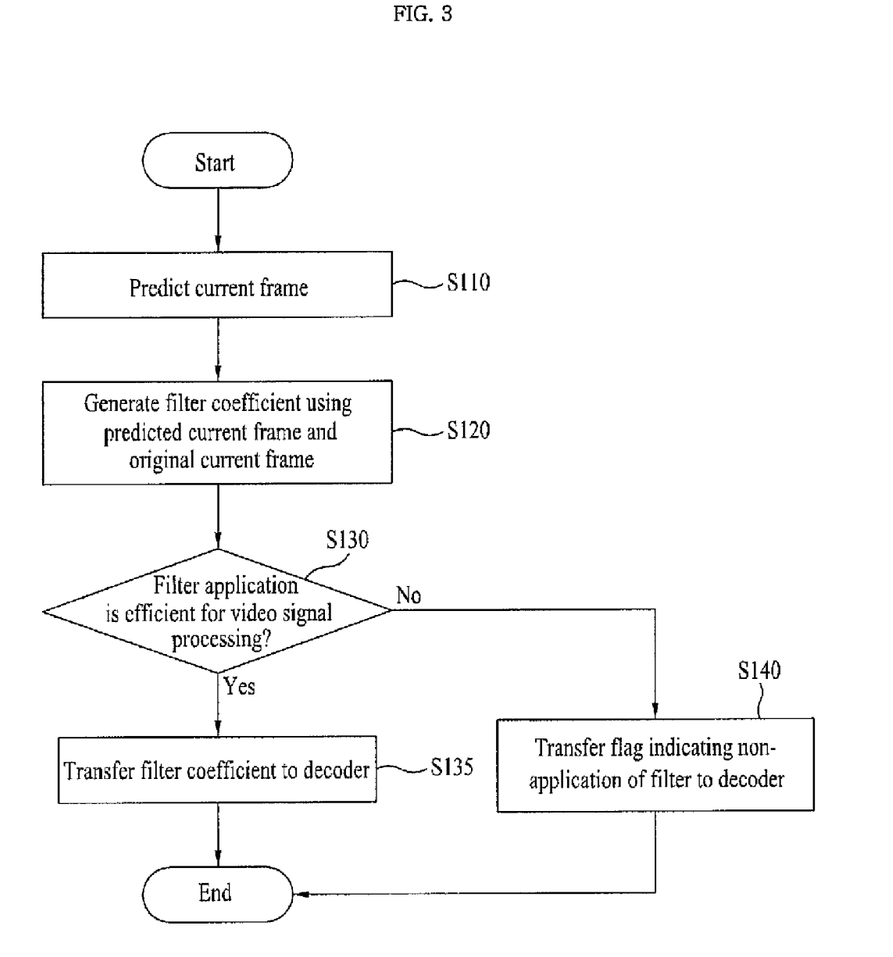
FIG. 3 is a flowchart of a process for applying a filter to a current frame predicted in an encoder according to a first embodiment of the present invention.

FIG. 3 is a flowchart of a process for applying a filter to a current frame predicted in an encoder according to a first embodiment of the present invention.

First of all, an encoder predicts a current picture using intra prediction or inter prediction [S110]. Yet, in case of a macroblock using intra prediction, intra prediction is performed using a predicted pixel neighbor to a current block within the macroblock instead of performing intra prediction using an already reconstructed pixel. The filtering unit (145) compares the predicted current picture to the original picture and is then able to generate a filter that minimizes a difference between the compared pictures [S120]. A method of generating the filter will be explained with reference to FIG. 5 later.

Although accuracy for prediction of a current picture can be enhanced by applying the generated filter to the predicted current picture, the application of the filter may reduce efficiency of video signal processing [S130]. If the filter application is efficient, the generated filter coefficient will be transferred to a decoder [S135]. If the filter application is inefficient, information indicating that the filter is not applied to the predicted frame will be transferred using a flag [S140].

Figure 4:
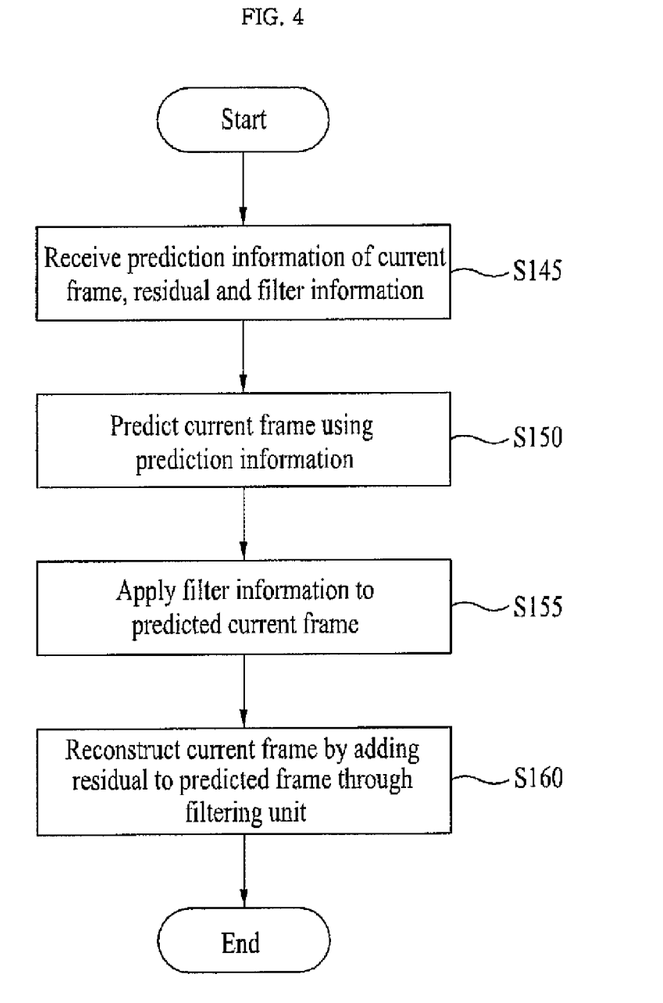
FIG. 4 is a flowchart of a process for applying a filter to a current frame predicted in a decoder according to a first embodiment of the present invention.

FIG. 4 is a flowchart of a process for applying a filter to a current frame predicted in a decoder according to a first embodiment of the present invention.

First of all, a decoder receives prediction information on a current frame, a residual and filter information from an encoder [S145]. Like the encoder, a current frame is predicted through inter prediction or intra prediction using the prediction information of the current frame [S150]. It is able to apply a filter transferred from the encoder to the predicted current frame. An original frame is reconstructed by adding a residual from an inverse-transforming unit to the predicted frame through the filtering unit [S160].

Figure 5:
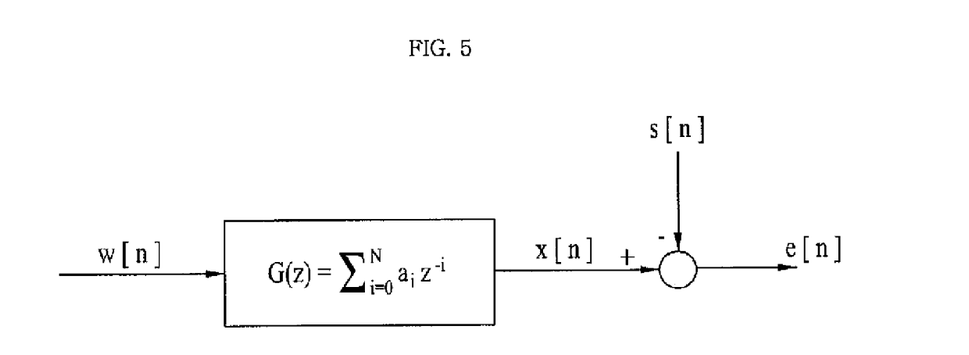
FIG. 5 is a schematic diagram for a method of generating a filter according to the present invention.

FIG. 5 is a schematic diagram for a method of generating a filter according to the present invention.

Referring to FIG. 5, w[n] indicates a predicted pixel value of a current picture and is a value inputted to a filter. And, x[n] is a predicted pixel value of a filtered current picture. In case that a filter of order N and with coefficients $a_i$ is used, x[n] can be represented as Formula 1.

$$x[n] = \sum_{i=0}^{N} a_i w[n-i] \qquad \text{[Formula 1]}$$

Moreover, s[n] is a pixel value of an original picture. If a difference between x[n] and s[n] is set to e[n], it is able to obtain $a_i$ which minimizes the e[n] and $a_i$ can be represented as Formula 2.

$$a_i = \arg\min E\{e^2[n]\} \qquad \text{[Formula 2]}$$

The $E\{e^2[n]\}$ can be represented as Formula 3.

$$\begin{aligned} E\{e^2[n]\} &= E\{(x[n]-s[n])^2\} \qquad \text{[Formula 3]} \\ &= E\{x^2[n]\} + E\{s^2[n]\} - 2E\{x[n]s[n]\} \\ &= E\left\{\left(\sum_{i=0}^{N} a_i w[n-i]\right)^2\right\} + \\ &\quad E\{s^2[n]\} - 2E\left\{\sum_{i=0}^{N} a_i w[n-i]s[n]\right\} \end{aligned}$$

If it is differentiated to find the $a_i$ which minimizes the expression above, Formula 4 is obtained.

$$\begin{aligned} \frac{\partial}{\partial a_i} E\{e^2[n]\} &= 2E\left\{\left(\sum_{j=0}^{N} a_j w[n-j]\right) w[n-i]\right\} - \qquad \text{[Formula 4]} \\ &\quad 2E\{s[n]w[n-i]\} \\ &= 2\sum_{j=0}^{N} E\{w[n-j]w[n-i]\} a_j - \\ &\quad 2E\{w[n-i]s[n]\} \end{aligned}$$

$i = 0, \ldots, N$

If w[n] and s[n] are stationary, Rw[m] and Rws[m] known respectively as the autocorrelation of w[n] and the cross-correlation between w[n] and s[n] are defined as Formula 5.

$$R_w[m] = E\{w[n]w[n+m]\}$$

$$R_{ws}[m] = E\{w[n]s[n+m]\} \qquad \text{[Formula 5]}$$

The Formula 4 can be represented as Formula 6 by using the Formula 5.

$$\frac{\partial}{\partial a_i} E\{e^2[n]\} = 2\sum_{j=0}^{N} R_w[j-i] a_j - 2R_{sw}[i] \qquad \text{[Formula 6]}$$

$i = 0, \ldots, N$

The $a_i$ is obtained by letting the derivative be equal to zero.

$$\begin{bmatrix} R_w[0] & R_w[1] & \ldots & R_w[N] \\ R_w[1] & R_w[0] & \ldots & R_w[N-1] \\ \vdots & \vdots & \ddots & \vdots \\ R_w[N] & R_w[N-1] & \ldots & R_w[0] \end{bmatrix} \begin{bmatrix} a_0 \\ a_1 \\ \vdots \\ a_N \end{bmatrix} = \begin{bmatrix} R_{sw}[0] \\ R_{sw}[1] \\ \vdots \\ R_{sw}[N] \end{bmatrix} \qquad \text{[Formula 7]}$$

The $a_i$ can be obtained from the Formula 7.

A process of applying a filter by considering a type of macroblock according to a first embodiment of the present invention is explained.

First of all, an encoder is able to generate a macroblock map, on which a type of a macroblock, i.e., an intra-macroblock or an inter-macroblock is marked. It is able to categorize a frame into a category including an intra-macroblock or an inter-macroblock only using the macroblock map. Filter information suitable per category is generated. The filter information is then transferred to a decoder.

The decoder receives a type of a macroblock from the encoder, and generates a macroblock map by using the type of a macroblock. Or A the decoder receives information of a macroblock map from the encoder, and generates a macroblock map by using the information of a macroblock map. A category is sorted per type of macroblock using the generated macroblock map. Filtering is performed on a predicted frame by applying the filter information transferred from the encoder to each category.

A process of applying a filter by considering a quantization parameter according to a first embodiment of the present invention is explained.

First of all, a quantization parameter may differ per macroblock. If the quantization parameter is large, a range of quantized values is small and a compression ratio is high. But, the quantized values have big differences from an original signal. On the contrary, if a quantization parameter is small, quantized values become proximate to an original signal but a compression ratio is lowered. Hence, the quantization parameter affects an image quality of a reconstructed picture.

A category is sorted per quantization parameter of a macroblock. Filter information suitable for each macroblock can be generated with reference to the category. The generated filter information is transferred to a decoder. It is then able to perform filtering per quantization parameter using the generated filter information.

A process of applying a filter by considering a coded block pattern (CBP) according to a first embodiment of the present invention is explained.

First of all, a coded block pattern (CBP) is a value indicating whether data exists within a macroblock. For instance, if a coded residual exits within a macroblock, reconstruction will be performed by adding the residual to a predicted macroblock. If a coded residual fails to exit within a macroblock, reconstruction will be performed by a predicted macroblock itself. Hence, a characteristic of an image may vary according to the CBP.

By considering the CBP, it is able to categorize a frame. It is able to generate a filter suitable per category. The filter information is transferred to a decoder. It is able to perform filtering per CBP using the filter information.

A process of applying a filter by considering a boundary strength according to a first embodiment of the present invention is explained.

First of all, a deblocking filter is provided to reduce a block distortion phenomenon and can be used by changing a strength of filter. But, a filter can not be used if efficiency of video signal processing is lowered due to the filter application. This depends on a boundary strength and a variation of an image sample around a boundary. And, the boundary strength is determined according to a relation with a presence or non-presence of an intra-coded macroblock, a motion vector value, a reference block or the like. Hence, the boundary strength is related to a characteristic of image.

Based on a boundary strength, it is able to categorize a frame through a deblocking filter. It is able to generate a filter suitable for each category. The filter information is transferred to a decoder. And, it is able to perform filtering per boundary strength using the filter information. Yet, in case that a filter is applied per category based on the boundary strength, deblocking filtering is omitted.

A process of applying a filter by considering a boundary area according to a first embodiment of the present invention is explained.

First of all, it is able to apply a filter to each area by categorizing a frame into a boundary area and a non-boundary area. A filtering unit receives a current frame predicted via inter or intra prediction. By performing a boundary search on the current frame through the deblocking filter based on threshold values for determining a presence or non-presence of a boundary, it is able to obtain a boundary area and a non-boundary area. Filter information to be applied to the boundary area or the non-boundary area is generated. The generated filter information, the threshold values and the like are transferred to a decoder. The decoder sorts a boundary area and a non-boundary area using the transferred filter information and the threshold values and then performs filtering on each of the areas.

For instance, in case of a boundary area, it is able to use a small-size filter to prevent a boundary area part from being excessively smoothened. On the contrary, in case of a non-boundary area, it is able to use a larger-size filter to remove noise generated from a quantization process.

A process of applying a filter by partitioning a region of a frame according to a first embodiment of the present invention is explained.

First of all, one frame is divided by N*N size. IT is determined whether to perform filtering on each N*N region. Based on this, it is able to generate a filtering map indicating whether to perform filtering. If it is determined to perform the filtering, it is able to generate filter coefficient suitable for each N*N region. The filter information and the filtering map are transferred to a decoder. Subsequently, the decoder performs filtering on a predicted frame using the filter information and the filtering map.

Figure 6:
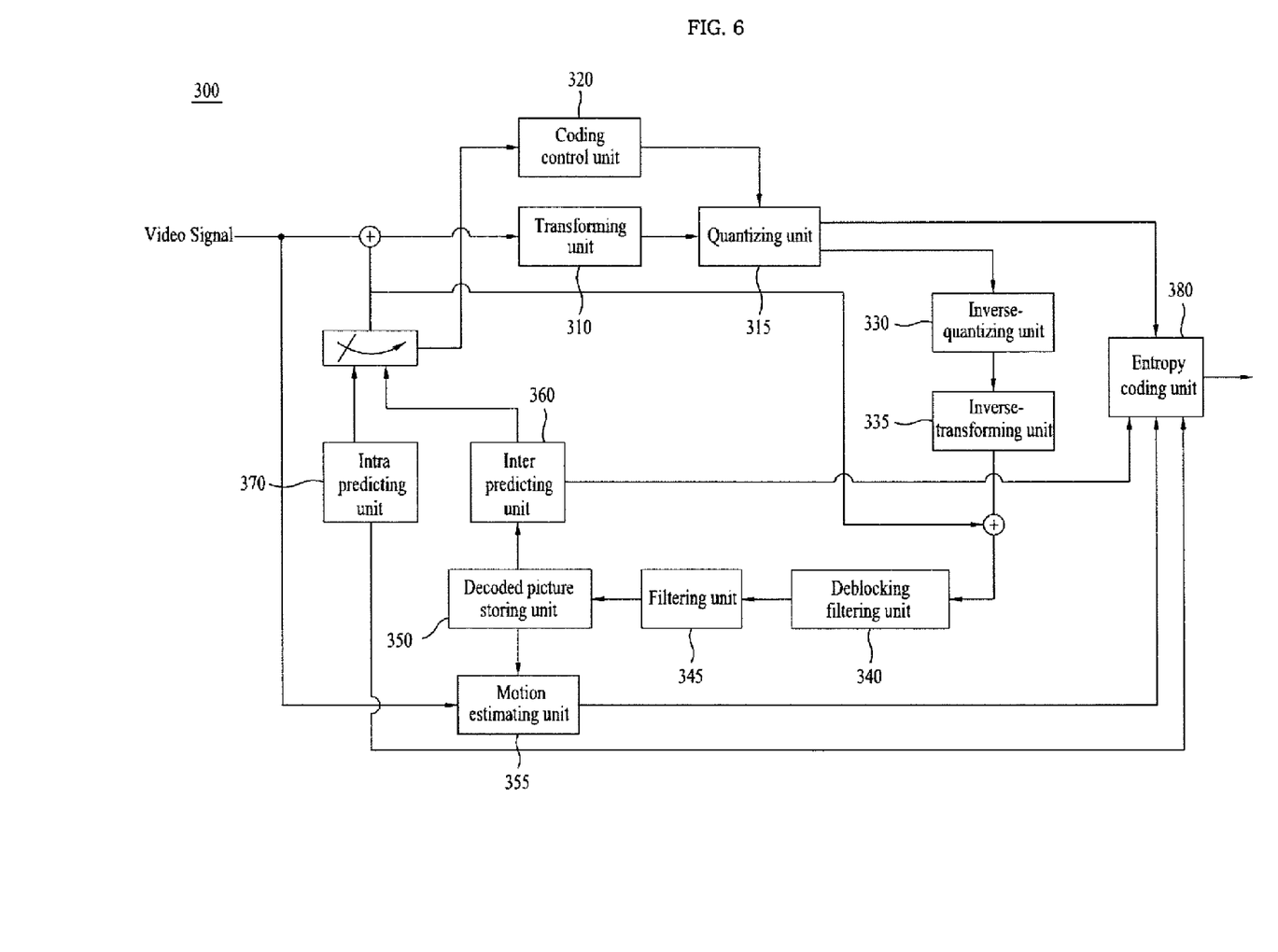
FIG. 6 is a schematic block diagram of a video signal encoding apparatus (300) according to a second embodiment of the present invention.

FIG. 6 is a schematic block diagram of a video signal encoding apparatus (300) according to a second embodiment of the present invention.

Referring to FIG. 6, a transforming unit (310), a quantizing unit (315), a coding control unit (320), a inverse-quantizing unit (330), an inverse-transforming unit (335), a deblocking filtering unit (340), a filtering unit (345), a decoded picture storing unit (350), a motion estimating unit (355), an inter predicting unit (360), an intra predicting unit (370) and an entropy coding unit (380). This configuration is identical to that shown in FIG. 1 except the filtering unit (345). The filtering unit (345) applies a filter to a picture decoded through a deblocking filter to minimize a difference from an original picture.

Figure 7:
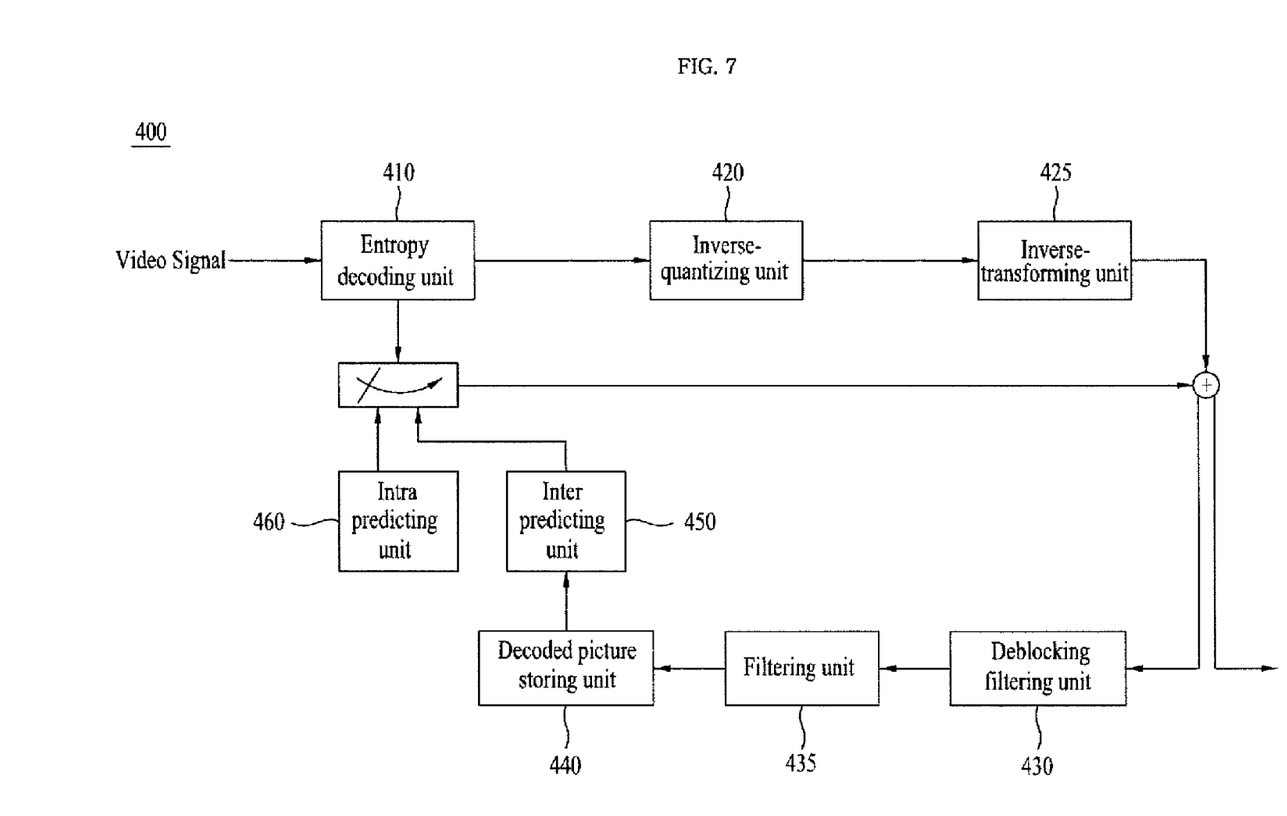
FIG. 7 is a schematic block diagram of a video signal decoding apparatus (400) according to a second embodiment of the present invention.

FIG. 7 is a schematic block diagram of a video signal decoding apparatus (400) according to a second embodiment of the present invention.

Referring to FIG. 7, a video signal decoding apparatus according to the present invention includes an entropy decoding unit (410), a inverse-quantizing unit (420), an inverse-transforming unit (425), a deblocking filtering unit (430), a filtering unit (435), a decoded picture storing unit (440), an inter predicting unit (450) and an intra predicting unit (460). This configuration is identical to that shown in FIG. 2 except the filtering unit (435). The filtering unit 435 applies a filter to a picture decoded through a deblocking filter to minimize a difference from an original picture.

Figure 8:
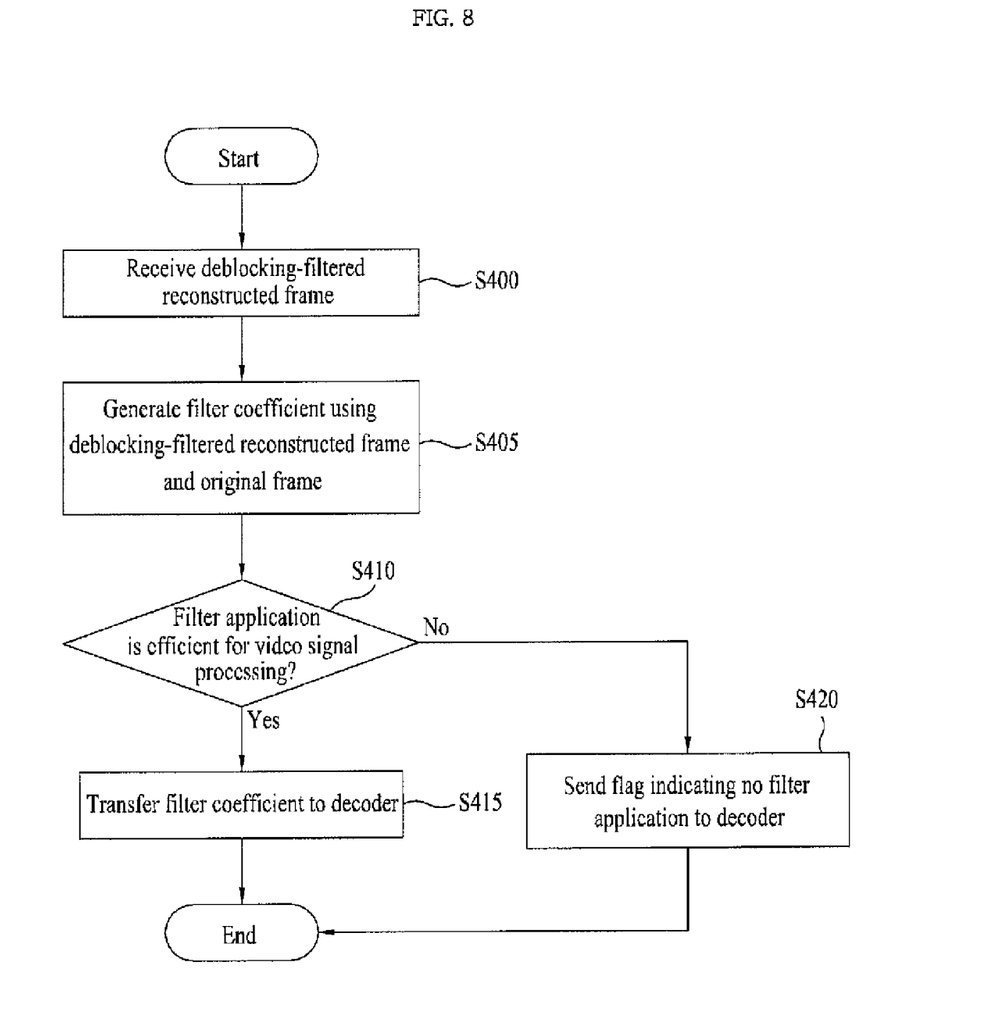
FIG. 8 is a flowchart of a process for applying a filter to a current frame through a deblocking filtering unit in an encoder according to a second embodiment of the present invention.

FIG. 8 is a flowchart of a process for applying a filter to a current frame through a deblocking filtering unit in an encoder according to a second embodiment of the present invention.

First of all, a filtering unit receives a current frame reconstructed through a deblocking filtering unit [S400]. The filtering unit compares the current frame and an original frame to each other and is then able to generate a filter minimizing a difference between the two frames [S405]. A method of generating the filter will be explained with reference to FIG. 10.

Yet, although accuracy for reconstruction of the current frame is improved by applying the generated filter to the current frame reconstructed through the deblocking filtering unit, it may even lower the accuracy [S410]. If the filter application is efficient, the generated filter coefficient will be transferred to a decoder [S415]. If the filter application is insufficient, information indicating that the filter will not be applied to a predicted frame is transferred using a flag [S420].

Figure 9:
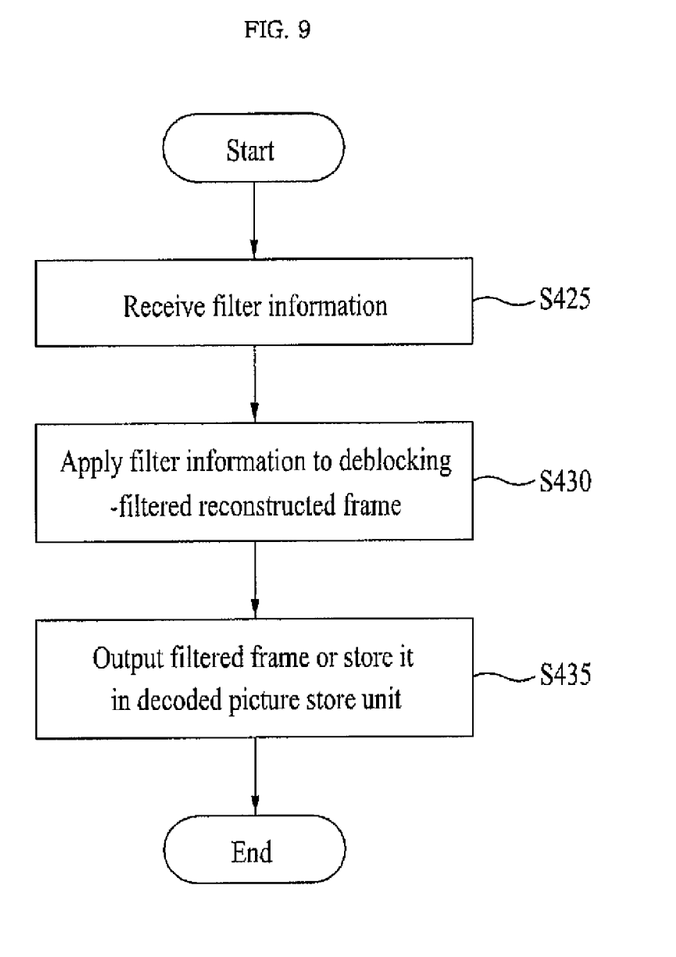
FIG. 9 is a flowchart of a process for applying a filter to a current frame through a deblocking filtering unit in a decoder according to a second embodiment of the present invention.

FIG. 9 is a flowchart of a process for applying a filter to a current frame through a deblocking filtering unit in a decoder according to a second embodiment of the present invention.

First of all, a decoder receives filter information on a current frame from an encoder [S425] and then applies the filter information to a reconstructed current frame through a deblocking filtering unit [S430]. The current frame through the filtering unit is outputted or can be stored in a decoded picture storing unit to be used for another frame prediction [S435].

Figure 10:
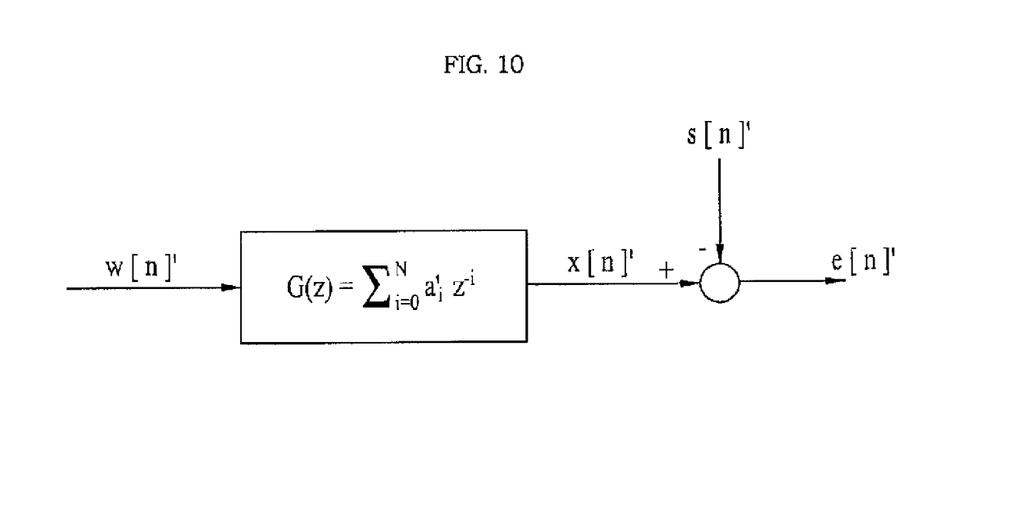
FIG. 10 is a schematic diagram for a method of generating a filter according to the present invention.

FIG. 10 is a schematic diagram for a method of generating a filter according to the present invention.

Referring to FIG. 10, w[n]' indicates a predicted pixel value of a current picture and is a value inputted to a filter. And, x[n]' is a predicted pixel value of a filtered current picture. In case that a filter of order N and with coefficients $a_i$ is used, x[n]' can be represented as Formula 8.

$$x[n]' = \sum_{i=0}^{N} a_i' w[n-i]' \qquad \text{[Formula 8]}$$

Moreover, s[n]' is a pixel value of an original picture. If a difference between x[n]' and s[n]' is set to e[n]', it is able to obtain $a_i'$ which minimizes the e[n]' and $a_i'$ can be represented as Formula 9.

$$a_i' = \mathrm{argmin} E\{e^2[n]'\} \qquad \text{[Formula 9]}$$

The $E\{e^2[n]'\}$ can be represented as Formula 10.

$$\begin{aligned} E\{e^2[n]'\} &= E\{(x[n]' - s[n]')^2\} \qquad \text{[Formula 10]} \\ &= E\{x^2[n]'\} - E\{s^2[n]'\} - \\ &\quad 2E\{x[n]'s[n]'\} \\ &= E\left\{\left(\sum_{i=0}^{N} a_i' w[n-i]'\right)^2\right\} + E\{s^2[n]'\} - \\ &\quad 2E\left\{\sum_{i=0}^{N} a_i' w[n-i]' s[n]'\right\} \end{aligned}$$

If it is differentiated to find the $a_i'$ which minimizes the expression above, Formula 11 is obtained.

$$\frac{\partial}{\partial a'_i} E\{e^2[n]'\} = 2E\left\{\left(\sum_{j=0}^{N} a'_j w[n-j]'\right) w[n-i]'\right\} -$$
$$2E\{s[n]' w[n-i]'\}$$
$$= 2\sum_{j=0}^{N} E\{w[n-j]' w[n-i]'\} a'_j -$$
$$2E\{w[n-i]' s[n]'\}$$

[Formula 11]

$$i = 0, \ldots, N$$

If w[n]' and s[n]' are stationary, Rw[m]' and Rws[m]' known respectively as the autocorrelation of w[n]' and the cross-correlation between w[n]' and s[n]' are defined as Formula 12.

$$R_w[m]' = E\{w[n]' w[n+m]'\}$$
$$R_{ws}[m]' = E\{w[n]' s[n+m]'\}$$

[Formula 12]

The Formula 11 can be represented as Formula 13 by using the Formula 12.

$$\frac{\partial}{\partial a'_i} E\{e^2[n]'\} = 2\sum_{j=0}^{N} R_w[j-i]' a'_j - 2R_{sw}[i]'$$

[Formula 13]

$$i = 0, \ldots, N$$

The $a_i'$ is obtained by letting the derivative be equal to zero.

$$\begin{pmatrix} R_w[0]' & R_w[1]' & \ldots & \ldots & \ldots & R_w[N]' \\ R_w[1]' & R_w[0]' & \ldots & \ldots & \ldots & R_w[N-1]' \\ \vdots & \vdots & \vdots & \vdots & \vdots & \vdots \\ \vdots & \vdots & \vdots & \vdots & \vdots & \vdots \\ R_w[N]' & R_w[N-1]' & \ldots & \ldots & \ldots & R_w[0]' \end{pmatrix} \begin{pmatrix} a'_0 \\ a'_1 \\ \vdots \\ \vdots \\ a'_N \end{pmatrix} = \begin{pmatrix} R_{sw}[0]' \\ R_{sw}[1]' \\ \vdots \\ \vdots \\ R_{sw}[N]' \end{pmatrix}$$

[Formula 14]

The $a_i'$ can be obtained from the Formula 14.

A process of applying a filter by considering a type of macroblock according to a second embodiment of the present invention is explained.

First of all, an encoder is able to generate a macroblock map, on which a type of a macroblock, i.e., an intra-macroblock or an inter-macroblock is marked. It is able to categorize a frame into a category including an intra-macroblock or an inter-macroblock only using the macroblock map. Filter information to be applied per category is generated. The filter information is then transferred to a decoder.

The decoder generates a macroblock map as well. A category is sorted per type of macroblock using the generated macroblock map. Filtering is performed by applying the filter information transferred from the encoder to each category.

A process of applying a filter by considering a quantization parameter according to a second embodiment of the present invention is explained.

First of all, a quantization parameter may differ per macroblock. If the quantization parameter is large, a range of quantized values is small and a compression ratio is high. But, the quantized values have big differences from an original signal. On the contrary, if a quantization parameter is small, quantized values become proximate to an original signal but a compression ratio is lowered. Hence, the quantization parameter affects an image quality of a reconstructed picture.

A category is sorted per quantization parameter of a macroblock. A filter suitable for each macroblock can be generated with reference to the category. The generated filter information is transferred to a decoder. It is then able to perform filtering per quantization parameter using the generated filter information.

A process of applying a filter by considering a coded block pattern (CBP) according to a second embodiment of the present invention is explained.

First of all, a coded block pattern (CBP) is a value indicating whether data exists within a macroblock. For instance, if a coded residual exits within a macroblock, reconstruction will be performed by adding the residual to a predicted macroblock. If a coded residual fails to exit within a macroblock, reconstruction will be performed by a predicted macroblock itself. Hence, a characteristic of an image may vary according to the CBP.

By considering the CBP, it is able to categorize a frame. It is able to generate a filter suitable per category. The filter information is transferred to a decoder. It is able to perform filtering per CBP using the filter information.

A process of applying a filter by considering a boundary strength according to a second embodiment of the present invention is explained.

First of all, a deblocking filter is provided to reduce a block distortion phenomenon and can be used by changing a strength of filter. But, a filter can not be used if efficiency of video signal processing is lowered due to the filter application. This depends on a boundary strength and a variation of an image sample around a boundary. And, the boundary strength is determined according to a relation with a presence or non-presence of an intra-coded macroblock, a motion vector value, a reference block or the like. Hence, the boundary strength is related to a characteristic of image.

Based on a boundary strength, it is able to categorize a frame through a deblocking filter. It is able to generate a filter suitable for each category. The filter information is transferred to a decoder. And, it is able to perform filtering per boundary strength using the filter information. Yet, in case that a filter is applied per category based on the boundary strength, deblocking filtering is omitted.

A process of applying a filter by considering a boundary area according to a second embodiment of the present invention is explained.

First of all, it is able to apply a filter to each area by categorizing a frame into a boundary area and a non-boundary area. A filtering unit receives a current frame reconstructed through a deblocking unit. By performing a boundary search on the current frame through the deblocking filter based on threshold values for determining a presence or non-presence of a boundary, it is able to obtain a boundary area and a non-boundary area. Filter information to be applied to the boundary area or the non-boundary area is generated. The generated filter information, the threshold values and the like are transferred to a decoder. The decoder sorts a boundary area and a non-boundary area using the transferred filter information and the threshold values and then performs filtering on each of the areas.

For instance, in case of a boundary area, it is able to use a small-size filter to prevent a boundary area part from being excessively smoothened. On the contrary, in case of a non-boundary area, it is able to use a larger-size filter to remove noise generated from a quantization process.

Figure 11:
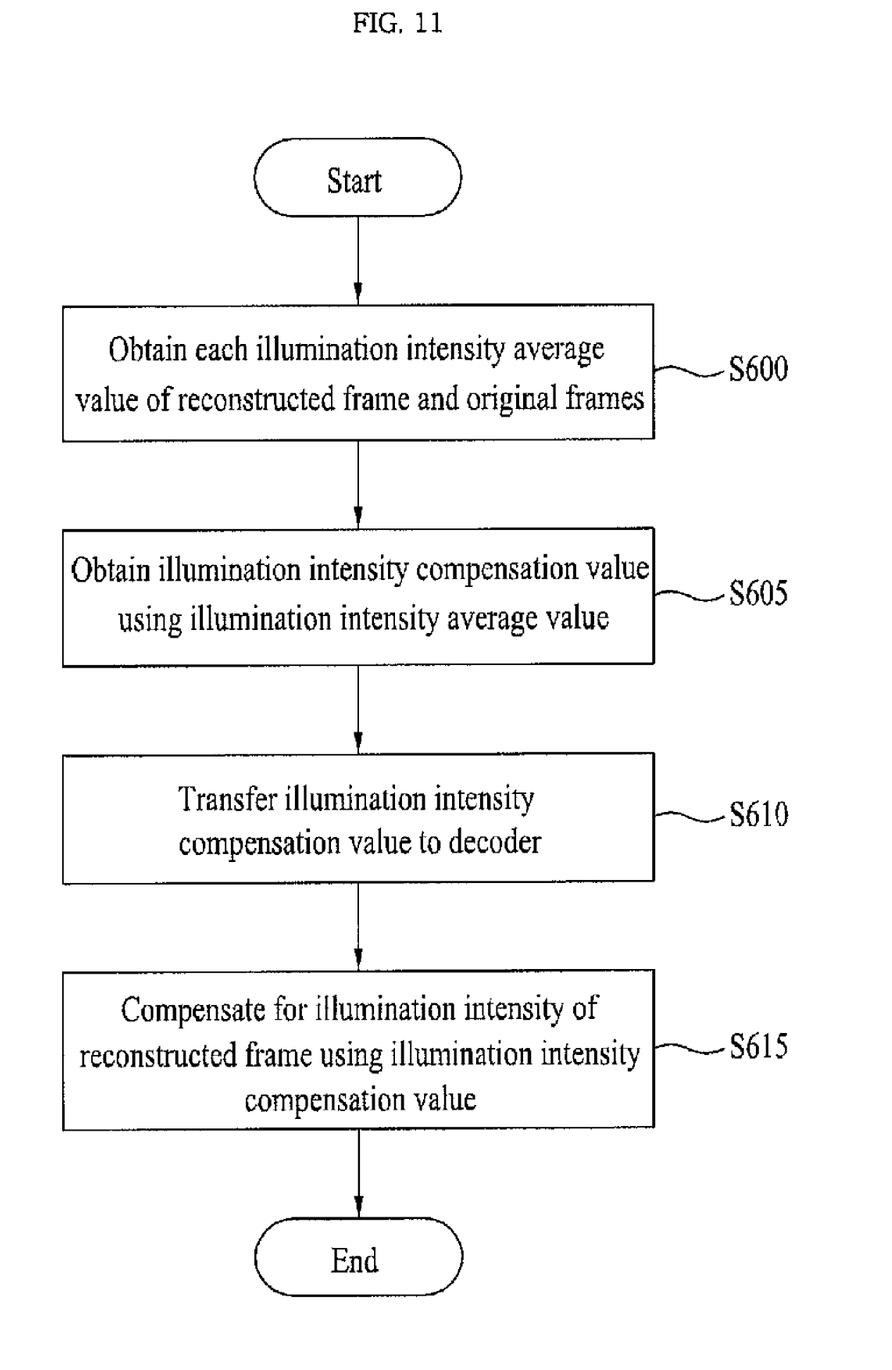
FIG. 11 is a flowchart for a method of compensating for an illumination intensity difference between an original frame and a reconstructed frame according to a third embodiment of the present invention.

FIG. 11 is a flowchart for a method of compensating for an illumination intensity difference between an original frame and a reconstructed frame according to a third embodiment of the present invention.

For instance, in video signal processing such as interpolation for finding an accurate motion vector, B-frame predicting process, deblocking process and the like, various rounding operations are performed. Hence, a difference between an illumination intensity average value of an original frame and an illumination intensity average value of a reconstructed frame is generated.

First of all, it is able to obtain an illumination intensity average value for a reconstructed frame and an illumination intensity average value for an original frame [S600]. A value resulting from dividing the illumination intensity average value of the reconstructed frame by the illumination intensity average value of the original frame is obtained [S605]. The obtained value is transferred to a decoder [S610].

Subsequently, the decoder is able to compensate for an illumination intensity of the reconstructed frame using the transferred value [S615].

Therefore, it is able to reduce errors caused by the various rounding operations.

Figure 12:
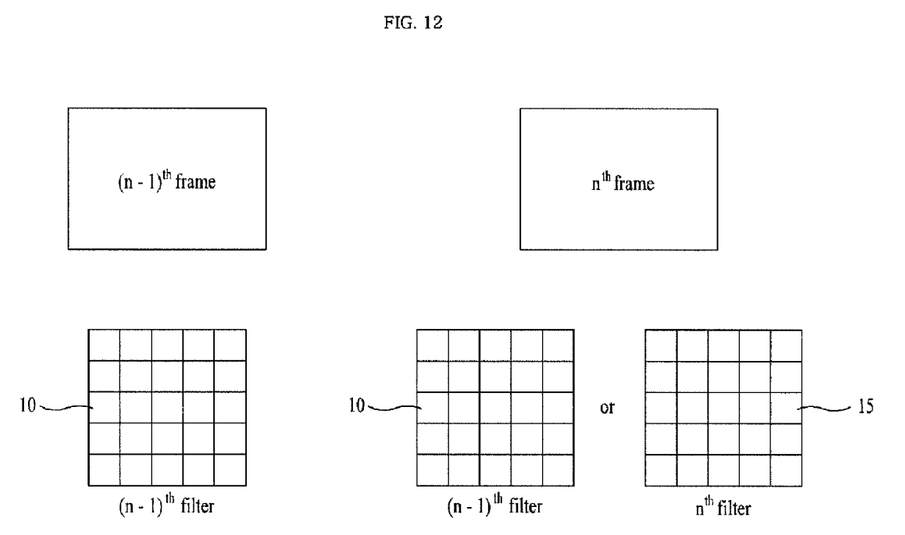
FIG. 12 is a diagram for a method of coding a filter coefficient using flag information according to a fourth embodiment of the present invention.

FIG. 12 is a diagram for a method of coding a filter coefficient using flag information according to a fourth embodiment of the present invention.

First of all, an encoder generates a filter to be applied to $(n-1)^{th}$ frame and a filter to be applied to $n^{th}$ frame (10,15). Yet, in case that the $(n-1)^{th}$ frame is similar to the $n^{th}$ frame, it is able to apply the filter for the $(n-1)^{th}$ frame to the $n^{th}$ frame. For this, it is able to use a flag instructing to apply a filter of the $(n-1)^{th}$ frame to the $n^{th}$ frame.

For instance, in case that the flag instructs to apply a filter of a previous frame to a current frame, the filter information of the $(n-1)^{th}$ frame (10) is used as a filter of the $n^{th}$ frame. The filter information of the $n^{th}$ frame (15) is not transferred to a decoder by being coded. Therefore, by reducing a bit size for the filter information transferred to the decoder, video signal processing can be efficiently performed. On the contrary, in case that the flag does not instruct to apply a filter of a previous frame to a current frame, the filter information of the $n^{th}$ frame (15) is transferred to a decoder by being coded.

Figure 13:
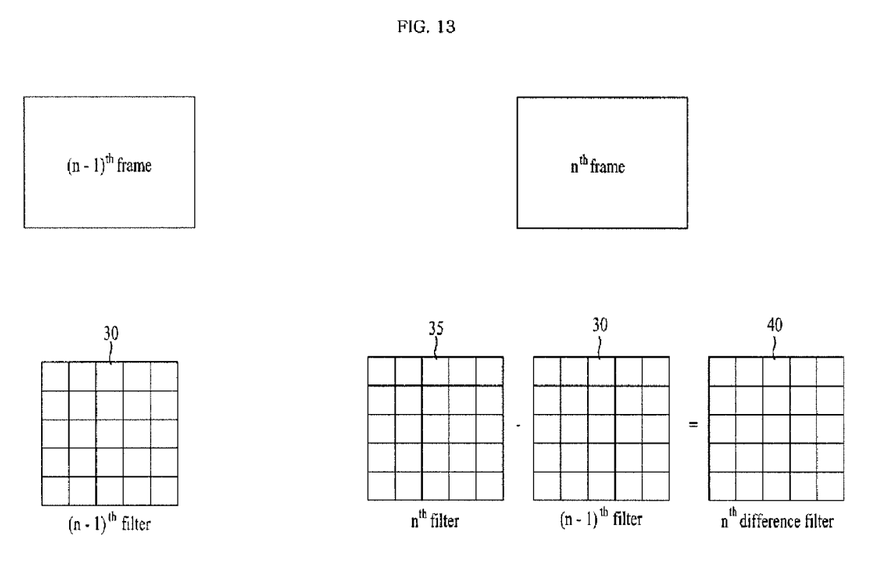
FIG. 13 is a diagram for a method of coding filter information using a difference filter according to a fourth embodiment of the present invention.

FIG. 13 is a diagram for a method of coding filter information using a difference filter according to a fourth embodiment of the present invention.

First of all, an encoder generates a filter to be applied to $(n-1)^{th}$ frame and a filter to be applied to $n^{th}$ frame (30,35). And, an $n^{th}$ difference filter (40), which is a difference between the filter of the $(n-1)^{th}$ frame and the filter of the $n^{th}$ frame is obtained. In transferring filter information of the $n^{th}$ frame to a decoder, the encoder is able to reduce a bit size by transferring the $n^{th}$ difference filter information (40) to the decoder only.

Subsequently, the decoder is able to obtain the filter of the $n^{th}$ frame using the transferred $n^{th}$ difference filter information (40) and the filter information of the $(n-1)^{th}$ frame (30).

Figure 14:
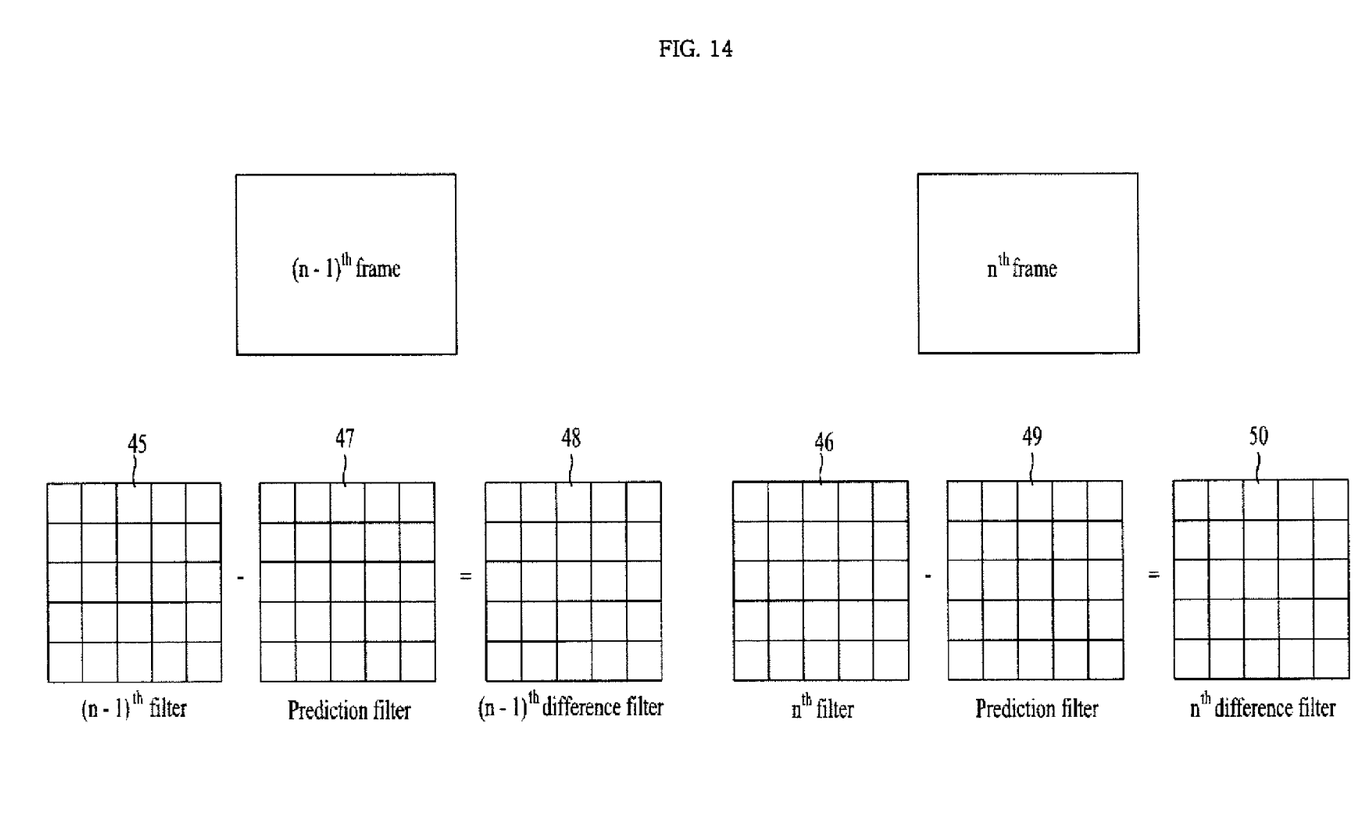
FIG. 14 is a diagram for a method of coding filter information using a prediction filter according to a fourth embodiment of the present invention.

FIG. 14 is a diagram for a method of coding filter information using a prediction filter according to a fourth embodiment of the present invention.

First of all, after filter information of each frame for a whole sequence has been generated, a prediction filter can be regarded as an average value of the filter information. An encoder generates filter informations of frames (45,46) and then obtains difference filters corresponding to differences between the prediction filter and the frame filters (48,60), respectively. Subsequently, the encoder transfers the difference filters and the prediction filter to a decoder. The decoder is able to obtain the filters of the frames using the difference filters (48,50) and the prediction filters (47,49), respectively. Therefore, a filter information size transferred to the decoder is reduced, whereby video signal processing can be efficiently performed.

Moreover, the prediction filter is not limited by the filter information average value of the respective frames for the whole sequence. And, it is able to use a filter of an $(n-1)^{th}$ frame as a prediction filter for an $n^{th}$ frame. Hence, it means that the prediction filter used for the $n^{th}$ frame (49) can be updated by the prediction filter of the $(n-1)^{th}$ frame (47) and the $(n-1)^{th}$ difference filter (48). If there is a big difference between the prediction filter and the filter of the $n^{th}$ frame, it may be inefficient to use the prediction filter as it is. Instead, it may be efficient to use a filter similar to the filter of the $n^{th}$ frame as the prediction filter.

INDUSTRIAL APPLICABILITY

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of decoding a video signal, comprising:
    obtaining, by a video decoding apparatus, first flag information indicating whether an adaptive filter is applied or not;
    obtaining, by the video decoding apparatus, second flag information when the first flag information indicates that the adaptive filter is applied, the second flag information indicating whether filter coefficients of an $N^{th}$ adaptive filter is derived from filter coefficients of an $(N-1)^{th}$ adaptive filter;
    obtaining, by the video decoding apparatus, the filter coefficients of the $N^{th}$ adaptive filter by adding difference filter coefficients of the $N^{th}$ adaptive filter to prediction filter coefficients, when the second flag information indicates that the filter coefficients of the $N^{th}$ adaptive filter is derived from the filter coefficients of the $(N-1)^{th}$ adaptive filter,
    wherein the difference filter coefficients of the $N^{th}$ adaptive filter is extracted from the video signal, the difference filter coefficients of the $N^{th}$ adaptive filter being a difference between the prediction filter coefficients and the filter coefficients of the $N^{th}$ adaptive filter, the prediction filter coefficients being the filter coefficients of the $(N-1)^{th}$ adaptive filter, N being a natural number greater than 1;
    performing by a deblocking filtering unit, a deblocking filtering on a decoded picture; and
    performing, by an adaptive filtering unit, an adaptive filtering on the deblocking-filtered and decoded picture by using the filter coefficients of the $N^{th}$ adaptive filter.

2. The method of claim 1, wherein the adaptive filtering is performed by considering a quantization parameter of a macroblock.

3. The method of claim 1, wherein the adaptive filtering is performed by considering a coded block pattern (CBP) of a macroblock.

4. The method of claim 1, wherein the adaptive filtering is performed by considering a block boundary strength between blocks and by omitting the deblocking filtering on the decoded picture.

5. The method of claim 1, wherein performing the adaptive filtering further comprises searching for a boundary area within a picture, wherein the adaptive filtering is performed by discriminating the boundary area and a non-boundary area.

6. The method of claim 1, further comprising compensating, by the video decoding apparatus, for an illumination intensity difference between an original picture and the adaptive filtered decoded picture.

7. An apparatus for decoding a video signal, comprising:

a decoding apparatus configured to:

obtain first flag information indicating whether an adaptive filter is applied or not, obtain second flag information when the first flag information indicates the adaptive filter is applied, the second flag information indicating whether filter coefficients of an $N^{th}$ adaptive filter is derived from filter coefficients of an $(N-1)^{th}$ adaptive filter, obtain the filter coefficients of the $N^{th}$ adaptive filter by adding difference filter coefficients of the $N^{th}$ adaptive filter to prediction filter coefficients, when the second flag information indicates that the filter coefficients of an $N^{th}$ adaptive filter is derived from filter coefficients of an $(N-1)^{th}$ adaptive filter, wherein the difference filter coefficients of the $N^{th}$ adaptive filter is extracted from the video signal, the difference filter coefficients of the $N^{th}$ adaptive filter being a difference between the prediction filter coefficients and the filter coefficients of the $N^{th}$ adaptive filter, the prediction filter coefficients being the filter coefficients of the $(N-1)^{th}$ adaptive filter, N being a natural number greater than 1, perform a deblocking filtering on a decoded picture, and perform an adaptive filtering on the deblocking-filtered decoded picture by using the filter coefficients of the $N^{th}$ adaptive filter.

* * * * *